United States Patent
Duggan et al.

(10) Patent No.: US 10,210,318 B2
(45) Date of Patent: Feb. 19, 2019

(54) METHODS AND SYSTEMS FOR CAPTURING BIOMETRIC DATA

(71) Applicants: John Anthony Duggan, Lyneham (AU); Conor Robert White, Fairfax, VA (US)

(72) Inventors: John Anthony Duggan, Lyneham (AU); Conor Robert White, Fairfax, VA (US)

(73) Assignee: DAON HOLDINGS LIMITED, George Town (KY)

(*) Notice: Subject to any disclaimer, the term of this patent is extended or adjusted under 35 U.S.C. 154(b) by 235 days.

(21) Appl. No.: 14/963,439

(22) Filed: Dec. 9, 2015

(65) Prior Publication Data

US 2017/0169202 A1 Jun. 15, 2017

(51) Int. Cl.
*G06K 9/00* (2006.01)
*G06F 21/32* (2013.01)

(52) U.S. Cl.
CPC ......... *G06F 21/32* (2013.01); *G06K 9/00255* (2013.01); *G06K 9/00926* (2013.01)

(58) Field of Classification Search
CPC ............... G06F 21/32; G06K 9/00255; G06K 9/00926; G06K 9/00912
See application file for complete search history.

(56) References Cited

U.S. PATENT DOCUMENTS

| | | | | |
|---|---|---|---|---|
| 7,301,529 B2* | 11/2007 | Marvit | ................ | G06F 1/1626 345/156 |
| 7,804,982 B2* | 9/2010 | Howard | ............ | G06F 17/30011 382/115 |
| 9,049,983 B1* | 6/2015 | Baldwin | ................ | G06F 21/32 |
| 9,223,955 B2* | 12/2015 | Lymberopoulos | ...... | G06F 21/32 |
| 9,348,435 B2* | 5/2016 | Feinstein | ............. | G01L 321/22 |
| 9,390,308 B2* | 7/2016 | Mankowski | ........... | G06F 21/32 |
| 9,526,006 B2* | 12/2016 | Turgeman | ............ | H04W 12/06 |
| 9,531,710 B2* | 12/2016 | Deutschmann | ..... | H04L 63/0861 |
| 9,539,500 B2* | 1/2017 | Leyvand | ............ | G06K 9/00221 |
| 9,596,508 B2* | 3/2017 | McCoy | ............. | G06K 9/00597 |
| 9,626,563 B2* | 4/2017 | Hanna | ................ | G06K 9/00604 |
| 9,639,679 B2* | 5/2017 | Nada | ...................... | G06K 9/036 |
| 9,679,194 B2* | 6/2017 | Ra | .......................... | G06T 7/73 |
| 9,679,197 B1* | 6/2017 | Sills | ....................... | G06F 3/017 |
| 9,767,351 B2* | 9/2017 | Burton | ............... | G06K 9/00342 |
| 9,798,958 B2* | 10/2017 | Nada | ..................... | G06F 21/32 |
| 9,874,933 B1* | 1/2018 | Carryer | .................. | G06F 3/013 |
| 2012/0176495 A1* | 7/2012 | De Mers | ................ | H04N 7/183 348/143 |
| 2013/0162799 A1* | 6/2013 | Hanna | ................... | A61B 5/117 348/78 |

(Continued)

*Primary Examiner* — Jason K Gee
*Assistant Examiner* — Shu C Gao
(74) *Attorney, Agent, or Firm* — Kevin McDermott, Esq.

(57) ABSTRACT

A method of capturing biometric data is provided that includes calculating, by a terminal device, an angle between a surface of the terminal device and an X-axis of the terminal device. When the angle is other than ninety degrees, a prompt is displayed on the terminal device that is designed to cause a terminal device user to adjust the position of the terminal device into an optimal position. After adjusting the position of the terminal device, the terminal device calculates the angle and when the angle is ninety degrees the terminal device captures biometric data from the user.

7 Claims, 4 Drawing Sheets

(56) References Cited

U.S. PATENT DOCUMENTS

| | | | |
|---|---|---|---|
| 2014/0099003 A1* | 4/2014 | Langley | G06K 9/00255 382/115 |
| 2015/0029093 A1* | 1/2015 | Feinstein | G01L 321/22 345/156 |
| 2015/0264255 A1* | 9/2015 | Budihal | H04N 5/23222 348/170 |
| 2016/0148384 A1* | 5/2016 | Bud | G06K 9/00255 348/207.11 |
| 2017/0094161 A1* | 3/2017 | Graham | G06T 7/73 |

* cited by examiner

METHODS AND SYSTEMS FOR CAPTURING BIOMETRIC DATA

BACKGROUND OF THE INVENTION

This invention relates generally to capturing biometric data, and more particularly, to methods and systems for capturing biometric data from users during enrollment in authentication systems and during authentication transactions.

Users conduct transactions with many different service providers in person and remotely over the Internet. Network-based transactions conducted over the Internet may involve purchasing items from a merchant web site or accessing confidential information from a website. Service providers that own and operate such websites typically require successfully identifying users before allowing a desired transaction to be conducted.

Users are increasingly using smart devices to conduct such network-based transactions and to conduct network-based biometric authentication transactions. However, some users have difficulty orienting the smart device to capture biometric data usable for generating trustworthy authentication transaction results. For example, some users have been known to position the smart device near their waist when capturing face biometric data. Many users still look downwards even if the device is held somewhere above waist level. Such users typically do not appreciate that differently positioning the smart device should result in capturing better quality biometric data. Consequently, enrolling and authenticating such users desiring to conduct network-based transactions has been known to be an annoying, inconvenient and timely endeavor.

BRIEF DESCRIPTION OF THE INVENTION

In one aspect, a method of capturing biometric data is provided that includes calculating, by a terminal device, an angle between a surface of the terminal device and an X-axis of the terminal device. When the angle is other than ninety degrees, a prompt is displayed on the terminal device that is designed to cause a terminal device user to adjust the position of the terminal device into an optimal position. After adjusting the position of the terminal device, the terminal device calculates the angle and when the angle is ninety degrees the terminal device captures biometric data from the user.

In another aspect, a terminal device for capturing biometric data is provided that includes a processor and a memory. The memory is configured to store data and the terminal device is associated with a network. The memory is in communication with the processor and has instructions stored thereon which, when executed by the processor, cause the processor to calculate an angle between a surface of the terminal device and an X-axis of the terminal device. Moreover, when the angle is other than ninety degrees, the instructions when executed by the processor cause the processor to display a prompt on the terminal device designed to cause a terminal device user to adjust the position of the terminal device into an optimal position. Furthermore, the instructions when executed by the processor cause the processor to calculate the angle after the position of the terminal device is adjusted, and capture biometric data from the user when the angle is ninety degrees.

In yet another aspect, a computer program recorded on a non-transitory computer-readable recording medium included in a terminal device is provided. The computer program is for enabling increased trustworthiness of biometric authentication transaction results. The computer program includes instructions, which when read and executed by the terminal device, cause the terminal device to calculate an angle between a surface of the terminal device and an X-axis of the terminal device. Moreover, when the angle is other than ninety degrees, the instructions when executed by the terminal device cause the terminal device to display a prompt designed to cause a terminal device user to adjust the position of the terminal device into an optimal position. Furthermore, the instructions when executed by the terminal device cause the terminal device to calculate the angle after the position of the terminal device is adjusted, and capture biometric data from the user when the angle is ninety degrees.

DETAILED DESCRIPTION OF THE INVENTION

Figure 1:
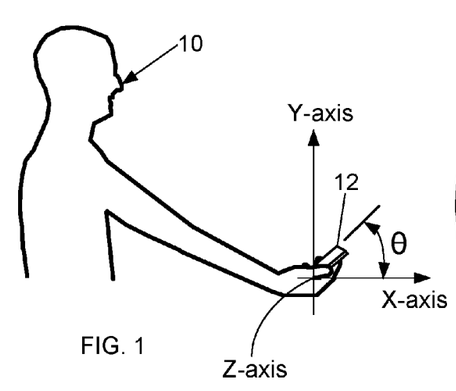
FIG. 1 is a side view of a user operating an example terminal device in a first orientation.

FIG. 1 is a side view of a user 10 operating a terminal device 12 during an enrollment transaction or during an authentication transaction. Specifically, the terminal device 12 and the user 10 are positioned relative to each other such that the user may operate the terminal device 12 to capture biometric data from his self. Alternatively, a person other than the user may operate the terminal device 12 while the terminal device 12 captures biometric data from the user.

A three-dimensional Cartesian coordinate system having X, Y, and Z-axes is superimposed on the terminal device 12. The Z-axis is oriented to extend perpendicularly into and out of the page. The three-dimensional Cartesian coordinate system represents the three-dimensional space that the terminal device 12 may freely move through. For example, the terminal device 12 may be rotated clockwise or counter-clockwise about the Z-axis. Rotating the terminal device 12 counter clockwise about the Z-axis is considered rotating the terminal device 12 towards the user 10. Rotating the terminal device 12 clockwise about the Z-axis is considered rotating the terminal device 12 away from the user 10. The terminal device 12 may be rotated about any combination of the X, Y, and Z-axes, and may be translated along any combination of the X, Y, and Z-axes. Moreover, the terminal device 12 may be simultaneously rotated about and translated along any combination of the X, Y and Z-axes in any manner.

The terminal device 12 is positioned at an angle θ with respect to the X-axis and is positioned below the face of the user 10. As the angle θ increases to about ninety degrees and as the terminal device 12 is also positioned to be about the same height as the user's face, the quality of face biometric data captured by the terminal device 12 increases. The angle θ is calculated between a front surface of the terminal device 12 and the X-axis, or between a back surface of the terminal device 12 and the X-axis.

Figure 2:
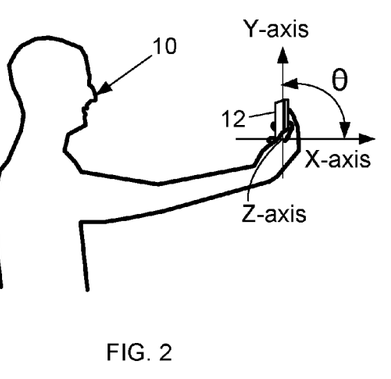
FIG. 2 is a side view of the user operating the example terminal device in an optimal position.

FIG. 2 is a side view of the user 10 operating the terminal device 12 in which the terminal device 12 is optimally positioned with respect to the user 10 to capture biometric data. The terminal device 12 is in the optimal position when the angle θ is ninety degrees with respect to the X-axis and is at about the same height as the face of the user 10. While in the optimal position, the terminal device 12 may capture adequate quality biometric data. The user 10 may translate and rotate the terminal device 12 into the optimal position in any manner.

Although the terminal device 12 is described as being in the optimal position when the angle θ is ninety degrees, the terminal device 12 may be considered optimally positioned when the angle θ is not ninety degrees. For example, the terminal device 12 may be considered optimally positioned when the angle θ is between eighty-five and ninety-five degrees. Moreover, the terminal device 12 may be considered optimally positioned at any angle θ at which adequate quality biometric data may be captured. Adequate biometric data is biometric data usable for generating trustworthy enrollment data or generating trustworthy authentication transaction results.

Figure 3:
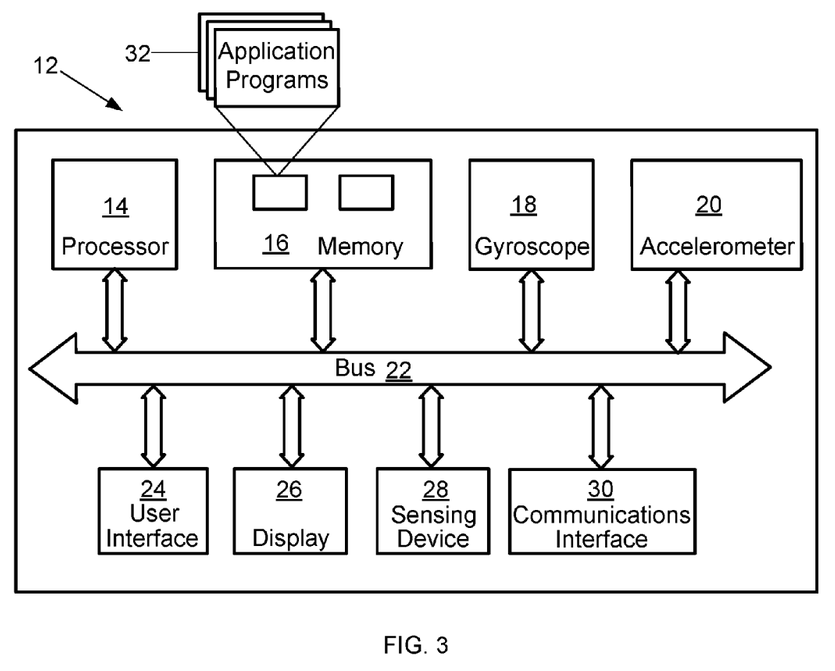
FIG. 3 is a block diagram of the example terminal device as shown in FIGS. 1 and 2.

FIG. 3 is a block diagram of the terminal device 12 used for capturing face biometric data during enrollment or during authentication transactions. The terminal device 12 includes one or more processors 14, a memory 16, a gyroscope 18, one or more accelerometers 20, a bus 22, a user interface 24, a display 26, a sensing device 28 and a communications interface 30. One example of the terminal device 12 is a smart phone. However, the terminal device 12 may alternatively be any device capable of capturing biometric data from users. Such devices include, but are not limited to, a cellular phone, a tablet computer, a phablet computer, a laptop computer, a personal computer (PC), and any type of device having wired or wireless networking capabilities such as a personal digital assistant (PDA).

The processor 14 executes instructions, or computer programs, stored in the memory 16. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are exemplary only, and are thus not intended to limit in any way the definition and/or meaning of the term "processor." General communication between the components in the terminal device 12 is provided via the bus 22.

As used herein, the term "computer program" is intended to encompass an executable program that exists permanently or temporarily on any computer-readable recordable medium that causes the terminal device 12 to perform at least the functions described herein. Application programs 32, also known as applications, are computer programs stored in the memory 16. Application programs 32 include, but are not limited to, an operating system, an Internet browser application, enrollment applications, authentication applications, user live-ness detection applications, and any special computer program that manages the relationship between application software and any suitable variety of hardware that helps to make-up a computer system or computing environment.

The memory 16 may be a computer-readable recording medium used to store data including, but not limited to, computer programs and user data records. The data record for each user may include enrollment data such as, but not limited to, record biometric data, record biometric templates and personal data of the user. The record biometric data is raw biometric data that is processed to generate at least one record biometric template. The record biometric template is typically used to confirm the identity of a user during authentication transactions. Alternatively, the record biometric data may be used to confirm the identities of users during authentication transactions.

Personal data includes any demographic information regarding a user including, but not limited to, a user's name, gender, age, date-of-birth, address, citizenship and marital status. Each data record may also include any kind of data that may be used to enhance the trustworthiness of user enrollment data and authentication transaction results. The data records are typically for users associated with the terminal device 12.

Configurable policies for enrollment and authentication transactions, some of which may be used to determine enrollment requirements and authentication data requirements, respectively, may also be stored in the memory 16. An enrollment data requirement is the data desired to be captured from users during enrollment. An authentication data requirement is the authentication data desired to be captured from users during authentication transactions. The record biometric data, the enrollment requirements, and the authentication data requirements may include any biometric modality desired to be used as a basis of enrollment and/or authentication such as, but not limited to, voice, face, finger, iris, palm, and electrocardiogram. Moreover, such biometric modalities may include any combination of biometric modalities, and may take any form such as, but not limited to, audio recordings, photographs, and video.

Moreover, the enrollment and authentication data requirements may be any type of authentication data, or any combination of different types of authentication data, for example, Global Positioning Coordinates and biometric data, and may be determined in any manner. The enrollment and authentication data requirements may also be determined by an individual or by any system (not shown) or device (not shown) configured to communicate with the terminal device 12 over a network (not shown). In the examples described herein, the enrollment and authentication data requirements are for face biometric data captured as an image. The image may be a photograph or an image extracted from a frame included in a video.

The memory 16 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 16 may include smart cards, SIMs or any other medium from which a computing device can read computer programs, applications or executable instructions.

The gyroscope 18 and the accelerometer 20 generate data regarding rotation and translation of the terminal device 12 that is communicated to the processor 14 and may be communicated to the memory 16 via the bus 22. The processor 14 uses the generated data to determine the position or orientation of the terminal device 12 including the angle θ with respect to the X-axis.

The user interface 24 and the display 26 allow interaction between a user and the terminal device 12. The display 26 may include a visual display or monitor that displays information to a user. For example, the display 26 may be a Liquid Crystal Display (LCD), active matrix display, plasma display, or cathode ray tube (CRT). The user interface 24 may include a keypad, a keyboard, a mouse, an infrared light source, a microphone, cameras, and/or speakers. Moreover, the user interface 24 and the display 26 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 12 to enter data, change settings, control functions, etc. Consequently, when the touch screen is touched, the user interface 26 communicates this change to the processor 14, and settings can be changed or user entered information can be captured and stored in the memory 16.

The sensing device 28 may include RFID components or systems for receiving information from other devices. The sensing device 28 may also include components with Bluetooth, Radio Frequency Identification (RFID), Near Field Communication (NFC), infrared, or other similar capabilities. The terminal device 12 may alternatively not include the sensing device 28.

The communications interface 30 provides the terminal device 12 with two-way data communications. Moreover, the communications interface 30 enables the terminal device 12 to conduct wireless communications such as cellular telephone calls and to wirelessly access the Internet over a network (not shown). By way of example, the communications interface 30 may be a digital subscriber line (DSL) card or modem, an integrated services digital network (ISDN) card, a cable modem, or a telephone modem to provide a data communication connection to a corresponding type of telephone line. As another example, the communications interface 30 may be a local area network (LAN) card (e.g., for Ethernet™ or an Asynchronous Transfer Model (ATM) network) to provide a data communication connection to a compatible LAN. As yet another example, the communications interface 30 may be a wire or a cable connecting the terminal device 12 with a LAN, or with accessories such as biometric capture devices. Further, the communications interface 30 may include peripheral interface devices, such as a Universal Serial Bus (USB) interface, a PCMCIA (Personal Computer Memory Card International Association) interface, and the like. Thus, it should be understood that the communications interface 30 may enable the terminal device 12 to conduct any type of wireless or wired communications such as, but not limited to, accessing the Internet. Although the terminal device 12 includes a single communications interface 30, the terminal device 12 may alternatively include multiple communications interfaces 30.

The communications interface 30 also allows the exchange of information across a network (not shown). The exchange of information may involve the transmission of radio frequency (RF) signals through an antenna (not shown). Moreover, the exchange of information may be between the terminal device 12 and between any other computer systems (not shown) and any other devices (not shown) capable of communicating over a network (not shown). Such a network (not shown) may be a 5G communications network. Alternatively, such a network (not shown) may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. Such a network (not shown) may also be any type of wired network or a combination of wired and wireless networks.

Other systems (not shown) that the terminal device 12 may communicate with include computer systems of service providers such as, but not limited to, financial institutions, medical facilities, national security agencies, and merchants. Other devices (not shown) that the terminal device 12 may communicate with include, but are not limited to, smart phones, tablet computers, laptop computers, personal computers and cellular phones.

When the terminal device 12 is not in the optimal position, a prompt is displayed on the terminal device 12 instructing the user to move the terminal device 12 into the optimal position. The prompt may be any type of information that may cause the user to move the terminal device 12 into the optimal position.

Figure 4:
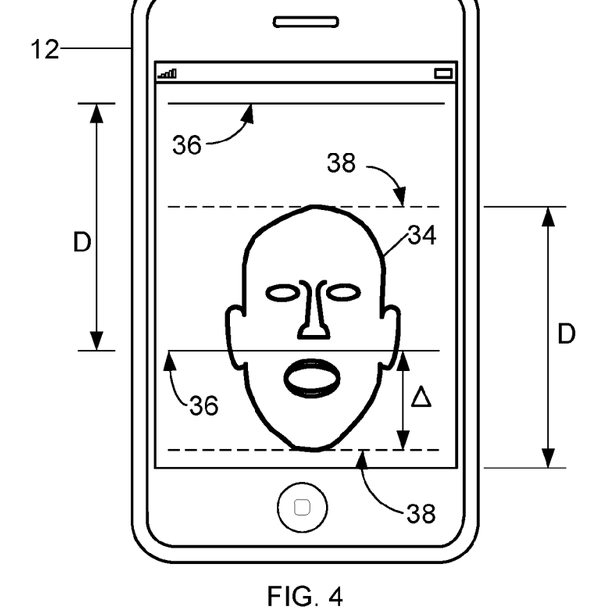
FIG. 4 is an enlarged plan view of the example terminal device shown in FIG. 1, further including an image of the user and guide lines.

FIG. 4 is an enlarged plan view of the example terminal device 12 displaying a facial image 34 of the user 10 during an authentication transaction. Additionally, a first pair of parallel guide lines 36 separated by a distance D are displayed. The guide lines 36 are positioned to delimit the vertical dimensions of the image 34 when the terminal device 12 is in the optimal position. A second pair of parallel lines 38 also separated by the distance D is displayed. The first and second pairs of parallel lines are offset from each other by a distance A. The distance A is calculated as a function of the angle θ. Consequently, as the terminal device 12 is moved and the angle θ approaches ninety degrees the distance A approaches zero and the pairs of parallel lines 36, 38 overlap. The terminal device 12 is in the optimal position when the lines 36, 38 overlap and the complete image 34 is displayed. Thus, the pairs of parallel lines 36, 38 function as a real time visual notification to users that facilitates capturing adequate quality biometric data from users.

Figure 5:
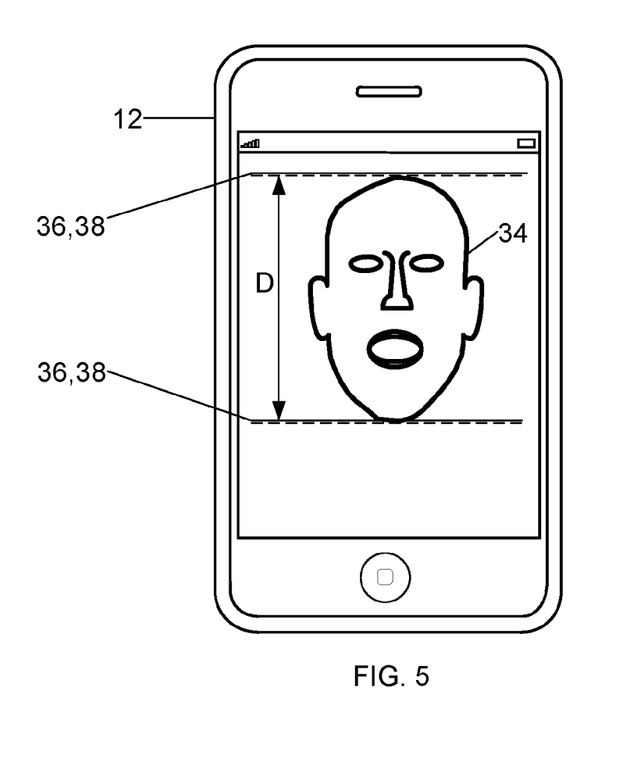
FIG. 5 is an enlarged plan view of the example terminal device shown in FIG. 1, further including an image of the user and guide lines as displayed by the terminal device in the optimal position.

FIG. 5 is an enlarged plan view of the terminal device 12 as shown in FIG. 4 illustrating overlapping parallel guide lines 36, 38 and image 34 when the terminal device 12 is in the optimal position.

Figure 6:
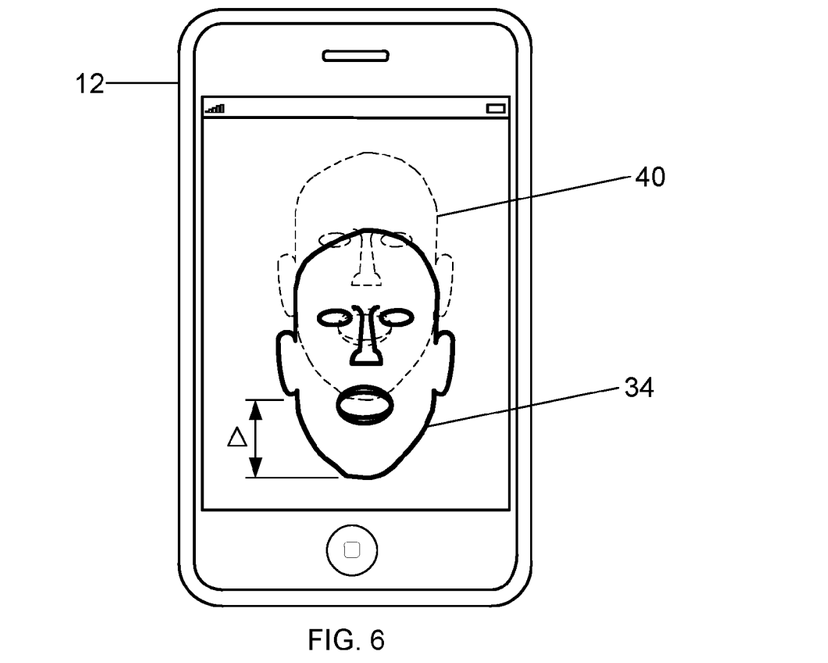
FIG. 6 is an enlarged plan view of the example terminal device shown in FIG. 1, further including an image of the user and a guide image.

FIG. 6 is an enlarged plan view of the example terminal device 12 displaying the image 34 and a guide image 40. The image 34 and the guide image 40 are offset from each other by the distance A. As the user 10 moves the terminal device 12 such that the image 34 and the guide image 40 overlap, the distance A approaches zero and the angle θ approaches ninety degrees. When the image 34 and the guide image 40 overlap, the terminal device 12 is in the optimal position.

Figure 7:
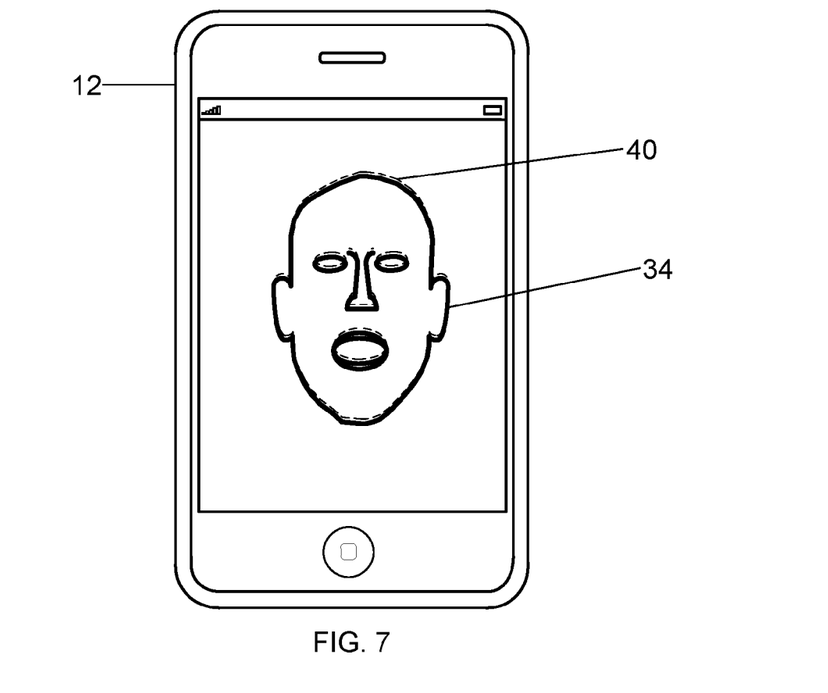
FIG. 7 is an enlarged plan view of the example terminal device shown in FIG. 1, further including an image of the user and a guide image as displayed by the terminal device in the optimal position.

FIG. 7 is an enlarged plan view of the terminal device 12 as shown in FIG. 6 illustrating the image 34 overlapping the guide image 40 when the terminal device 12 is in the optimal position.

Figure 8:
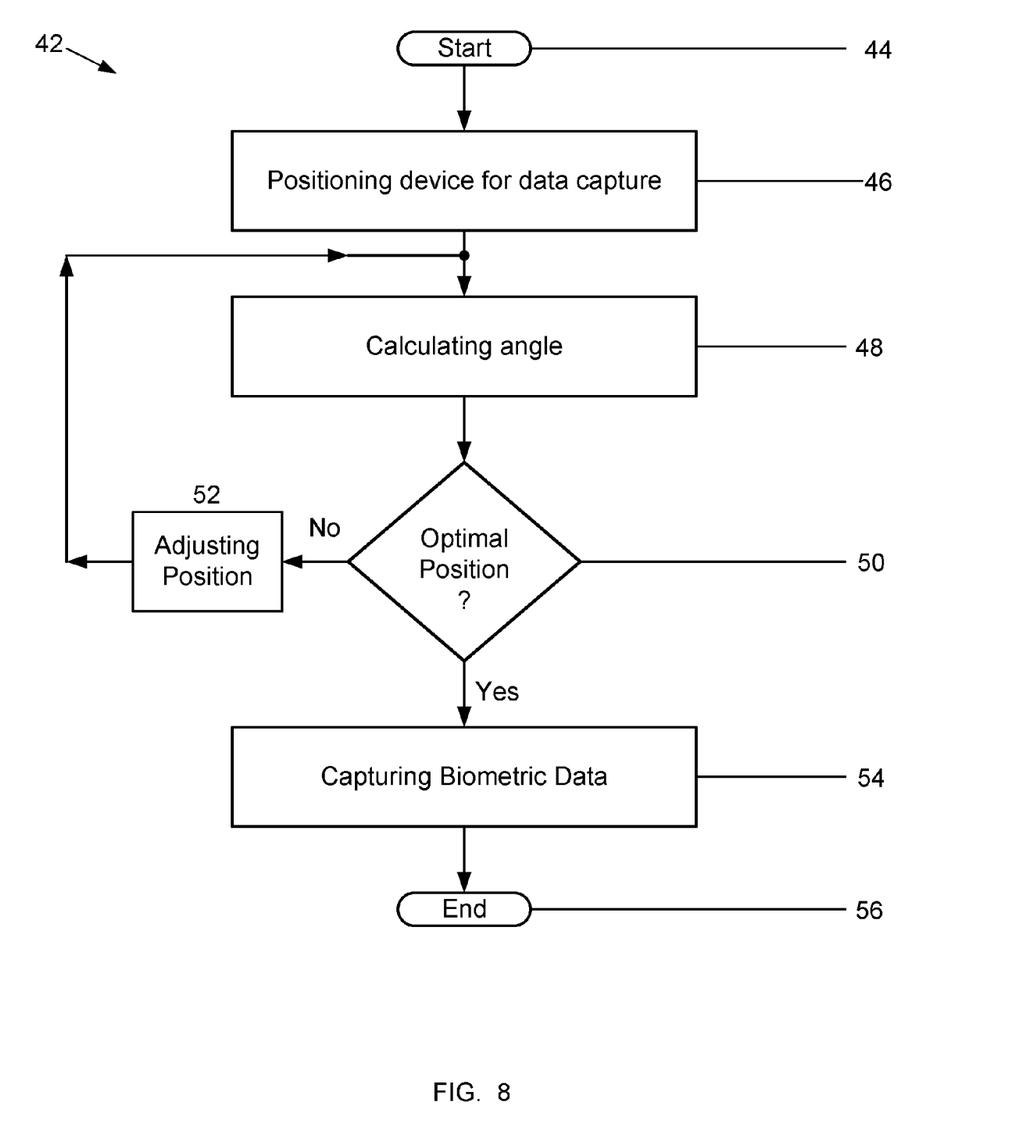
FIG. 8 is a flowchart illustrating an example method for capturing biometric data.

FIG. 8 is a flowchart 42 illustrating one example of a method for capturing biometric data from a user. The process starts 44 when a user activates and positions 46 the terminal device 12 to capture biometric data from his self. Next, processing continues by calculating 48 the angle θ and determining 50 whether the terminal device 12 is in the optimal position to capture adequate quality biometric data. When the angle θ is other than ninety degrees, processing continues by displaying 52 a prompt on the terminal device 12 designed to cause the user to adjust the position of the terminal device 12 into the optimal position. The prompt may be an instruction to move the terminal device 12 to about the same height as the face of the user, or the prompt may be the guide lines 36, 38 or the guide images 34 and 40.

After the position of the terminal device 12 is adjusted 52, processing continues by calculating 48 the angle θ and determining whether the adjusted position is the optimal position. When the angle θ is ninety degrees, the terminal device 12 is considered to be in the optimal position and processing continues by capturing 54 biometric data from the user with the terminal device 12. Next, processing ends 56.

The example methods described herein may be conducted entirely by the terminal device 12, or partly on the terminal device 12 and partly on other devices (not shown) and systems (not shown) able to communicate with the terminal device 12 over a network. Moreover, data described herein as being stored in the memory 16 may alternatively be stored in any system (not shown) or device (not shown) able to communicate with the terminal device 12 over a network.

In each example embodiment, the above-described methods and systems for capturing biometric data from users facilitates orienting a terminal device into an optimal position from which biometric data may be captured that can be used to generate trustworthy authentication transaction results. More specifically, an angle between a surface of the terminal device and the X-axis is calculated and the orientation of the terminal device is determined. When the angle is other than ninety degrees, processing continues by displaying a prompt on the terminal device designed to cause the user to adjust the position of the terminal device into the optimal position. After the position of the terminal device is adjusted, the angle is calculated and the orientation of the terminal device is determined. When the angle is ninety degrees, the terminal device is considered to be in the optimal position and biometric data is captured from the user with the terminal device. As a result, enrollment data may be captured more quickly and conveniently, and users may be authenticated more quickly and conveniently with biometric data captured by the terminal device.

The example embodiments of methods for capturing biometric data described above should not be considered to imply a fixed order for performing the process steps. Rather, the process steps may be performed in any order that is practicable, including simultaneous performance of at least some steps. Moreover, the methods are not limited to use with the specific computer systems and/or devices described herein, but rather, the methods can be utilized independently and separately from other computer components described herein. Furthermore, the invention is not limited to the embodiments of the methods described above in detail. Rather, other variations of the methods may be utilized within the spirit and scope of the claims.

What is claimed is:

1. A method of capturing biometric data comprising:
   generating, by an accelerometer and gyroscope included in a terminal device, data regarding rotation and translation of the terminal device;
   calculating, by the terminal device, based on the generated data, an angle between a surface of the terminal device and an X-axis of the terminal device;
   when the angle is other than ninety degrees, displaying, by the terminal device an image of a biometric modality of a user, a first pair of parallel lines, and a second pair of parallel lines;
   moving the first pair of parallel lines to overlap the second pair of parallel lines as the terminal device is moved into an optimal position in response to said displaying step, wherein each pair of parallel lines delimits the dimensions of the image in the optimal position; and
   when the first and second pairs of parallel lines overlap, capturing, by the terminal device, biometric data from the user.

2. A method of capturing biometric data in accordance with claim 1, said capturing step further comprising capturing biometric data from the user when the terminal device is at about the same height as the face of the user.

3. A method of capturing biometric data in accordance with claim 1, said capturing step comprising capturing face biometric data.

4. A terminal device for capturing biometric data comprising:
   an accelerometer;
   a gyroscope;
   a processor; and
   a memory for storing data, said terminal device being associated with a network and said memory being in communication with said processor and having instructions stored thereon which, when executed by said processor, cause said terminal device to:
   receive from said accelerometer and gyroscope data regarding rotation and translation of said terminal device;
   calculate, based on the received data, an angle between a surface of said terminal device and an X-axis of said terminal device;
   when the angle is other than ninety degrees, display an image of a biometric modality of a user, a first pair of parallel lines, and a second pair of parallel lines;
   move the first pair of parallel lines to overlap the second pair of parallel lines as the terminal device is moved into an optimal position in response to displaying the lines, wherein each pair of parallel lines delimits the dimensions of the image in the optimal position; and
   when the first and second pairs of parallel lines overlap, capturing, by the terminal device, biometric data from the user.

5. A terminal device in accordance with claim 4, wherein the instructions when executed by said processor further cause said terminal device to capture biometric data from the user when said terminal device is at about the same height as the face of the user.

6. A non-transitory computer-readable recording medium included in a terminal device having a computer program recorded thereon for enabling increased trustworthiness of biometric authentication transaction results, the computer program being comprised of instructions, which when read and executed by the terminal device, cause the terminal device to:

receive from an accelerometer and a gyroscope included in the terminal device, data regarding rotation and translation of the terminal device;

calculate, based on the received data, an angle between a surface of the terminal device and an X-axis of the terminal device;

when the angle is other than ninety degrees, display an image of a biometric modality of a user, a first pair of parallel lines, and a second pair of parallel lines;

move the first pair of parallel lines to overlap the second pair of parallel lines as the terminal device is moved into an optimal position in response to displaying the lines, wherein each pair of parallel lines delimits the dimensions of the image in the optimal position; and when the first and second pairs of parallel lines overlap, capturing, by the terminal device, biometric data from the user.

7. A non-transitory computer-readable recording medium in accordance with claim 6, wherein the instructions when read and executed by the terminal device further cause the terminal device to capture biometric data from the user when the terminal device is at about the same height as the face of the user.

* * * * *